(12) United States Patent
Kim et al.

(10) Patent No.: US 8,126,063 B2
(45) Date of Patent: Feb. 28, 2012

(54) SYSTEM AND METHOD FOR STILL OBJECT DETECTION BASED ON NORMALIZED CROSS CORRELATION

(75) Inventors: Yeong-Taeg Kim, Irvine, CA (US); Surapong Lertrattanapanich, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 1260 days.

(21) Appl. No.: 11/766,666

(22) Filed: Jun. 21, 2007

(65) Prior Publication Data
US 2008/0317123 A1    Dec. 25, 2008

(51) Int. Cl.
*H04N 7/26* (2006.01)
*H04N 11/02* (2006.01)
*H04N 7/12* (2006.01)

(52) U.S. Cl. .................................. 375/240.26
(58) Field of Classification Search .............. 375/240.26
See application file for complete search history.

(56) References Cited

U.S. PATENT DOCUMENTS

| | | | |
|---|---|---|---|
| 5,502,492 A | 3/1996 | Jung | |
| 5,777,682 A | 7/1998 | De Haan et al. | |
| 5,812,787 A * | 9/1998 | Astle | 709/247 |
| 6,219,436 B1 * | 4/2001 | De Haan et al. | 382/107 |
| 6,278,736 B1 * | 8/2001 | De Haan et al. | 375/240.16 |
| 6,459,455 B1 | 10/2002 | Jiang et al. | |
| 7,034,888 B2 | 4/2006 | Lin et al. | |
| 7,184,100 B1 * | 2/2007 | Wilf et al. | 348/700 |
| 2002/0172286 A1 * | 11/2002 | Ohki | 375/240.16 |
| 2003/0053543 A1 * | 3/2003 | Bhaumik et al. | 375/240.16 |
| 2004/0131267 A1 * | 7/2004 | Adiletta et al. | 382/236 |
| 2005/0031041 A1 * | 2/2005 | Chujoh et al. | 375/240.24 |
| 2005/0078222 A1 | 4/2005 | Liu et al. | |
| 2005/0100095 A1 * | 5/2005 | Itoh et al. | 375/240.16 |
| 2006/0280249 A1 * | 12/2006 | Poon | 375/240.16 |
| 2008/0002776 A1 * | 1/2008 | Borer et al. | 375/240.26 |

OTHER PUBLICATIONS de Haan, Gerard. "Video Scanning Format Conversion and Motion Estimation", 1999.*
Kim, Hae Yong et al. "Real-Time Opaque and Semi-Transparent TV Logos Detection", 2006.*
Love, Nicole S. et al. "An Empirical Study of Block Matching Techniques for the Detection of Moving Objects", Jan. 2006.*
Puri, A. et al. "An Efficient Block-Matching Algorithm for Motion-Compensated Coding", 1987 IEEE.*
Cafforio et al., "Motion compensated image interpolation," *IEEE Transaction on Communications*, vol. 38, No. 2, pp. 215-222 (Feb. 1990).

(Continued)

*Primary Examiner* — Michael Simitoski

(57) ABSTRACT

A system and method for still object detection in digital video data based on normalized cross correlation are disclosed. One embodiment of the method includes providing video data including a sequence of frames. A pair of consecutive frames are selected from the sequence of frames. A pair of groups of pixels are selected from the pair of consecutive frames. The groups are at corresponding positions on the pair of consecutive frames. The video data includes pixel data for each of the pixels. A normalized cross correlation (NCC) operation is conducted on the pixel data of the selected pair of groups of pixels, thereby generating an NCC value. It is determined whether the NCC value is within a predetermined range, thereby providing whether the groups of pixels displays at least a portion of a still object.

27 Claims, 10 Drawing Sheets

OTHER PUBLICATIONS

De Haan, Gerard, "Video Processing for Multimedia System," University Press Eindhoven, $2^{nd}$ ed. (2000).

Meisinger et al., "Automatic TV Logo Removal Using Statistical Based Logo Detection and Frequency Selectively In Painting," European Signal Processing Conference (EUSIPCO) (Sep. 2005).

Riaan Van Den Dool, "Image Processing Tools," Electric Systems Laboratory, 6 pages (May 2004).

Yan et al., "Automatic Video Log Detection and Removal," *Multimedia Systems,* Springer Berlin, vol. 10, No. 5, pp. 379-391 (Aug. 2005).

* cited by examiner

FIG. 5A

|  |  |  |  |  |
|---|---|---|---|---|
| $P_{11}$ | $P_{21}$ | $P_{31}$ | $P_{41}$ | $P_{51}$ |
| $P_{12}$ | $P_{22}$ | $P_{32}$ | $P_{42}$ | $P_{52}$ |
| $P_{13}$ | $P_{23}$ | $P_{33}$ | $P_{43}$ | $P_{53}$ |
| $P_{14}$ | $P_{24}$ | $P_{34}$ | $P_{44}$ | $P_{54}$ |
| $P_{15}$ | $P_{25}$ | $P_{35}$ | $P_{45}$ | $P_{55}$ |

FIG. 5B

|  |  |  |  |  |  |  |
|---|---|---|---|---|---|---|
| $P_{11}$ | $P_{21}$ | $P_{31}$ | $P_{41}$ | $P_{51}$ | $P_{61}$ | $P_{71}$ |
| $P_{12}$ | $P_{22}$ | $P_{32}$ | $P_{42}$ | $P_{52}$ | $P_{62}$ | $P_{72}$ |
| $P_{13}$ | $P_{23}$ | $P_{33}$ | $P_{43}$ | $P_{53}$ | $P_{63}$ | $P_{73}$ |
| $P_{14}$ | $P_{24}$ | $P_{34}$ | $P_{44}$ | $P_{54}$ | $P_{64}$ | $P_{74}$ |
| $P_{15}$ | $P_{25}$ | $P_{35}$ | $P_{45}$ | $P_{55}$ | $P_{65}$ | $P_{75}$ |

FIG. 5C

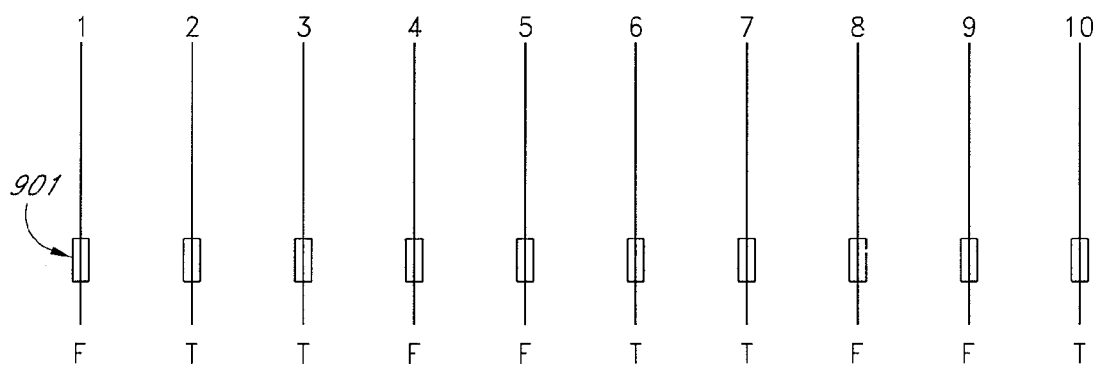
FIG. 9A
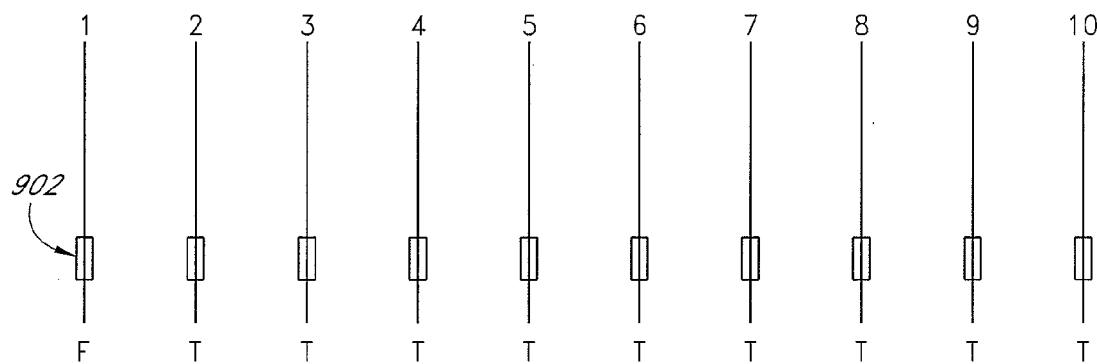
FIG. 9B
FIG. 10A
FIG. 10B

SYSTEM AND METHOD FOR STILL OBJECT DETECTION BASED ON NORMALIZED CROSS CORRELATION

CROSS-REFERENCE TO RELATED APPLICATIONS

This application is related to U.S. application Ser. No. 11/766,722, filed Jun. 21, 2007, the disclosure of which is incorporated herein by reference.

BACKGROUND OF THE INVENTION

1. Field of the Invention

The present invention relates to a system and method for processing digital video data, and particularly to a system and method for detecting still objects in digital video data.

2. Description of the Related Technology

In digital video systems, a large amount of digital data is typically used for displaying video. However, conventional transmission channels have a limited capacity to transmit data. Thus, various video compression techniques have been employed to transmit digital video data over conventional transmission channels.

Interframe coding is one video compression technique. Referring to FIG. 1A, in interframe coding, video data is generated to have key frames 10 at a frequency of, for example, 24 Hz (24 frames/second). Referring to FIG. 1B, a display device generates interframes 20 interpolated from the key frames 10 and inserts them in between the key frames 10. In the illustrated example, two interframes 20 are inserted between two key frames 10, and thus the display device can display video at a frequency of 72 Hz (72 frames/second) using 24 Hz-video data. In other examples, display devices can display video at various other frequencies.

In generating interframes, motion compensated interpolation (MCI) can be used to further enhance the accuracy of interframe coding. Referring to FIG. 1C, in MCI, a motion trajectory 30 in video data is estimated based on two succeeding key frames 10. In estimating a motion trajectory, a two-dimensional motion vector is used to represent the displacement of a moving object between key frames 10. The motion vector is used to generate interframes 20 to be inserted between the key frames 10.

SUMMARY OF CERTAIN INVENTIVE ASPECTS

One inventive aspect is a method of detecting a still object in digital video data. The method comprises: providing video data comprising a sequence of frames; selecting a plurality of consecutive frames from the sequence of frames; selecting a group of pixels from each of the plurality of consecutive frames, the selected groups of pixels being at corresponding positions in the plurality of consecutive frames, the video data comprising pixel data for each of the pixels; performing normalized cross correlation (NCC) on the pixel data of two of the selected groups of pixels, thereby generating an NCC value; and determining whether the NCC value is within a predetermined range indicative of there being at least a portion of a still object in the groups of pixels.

The pixel data comprises at least one of luminance data and chrominance data. The method may further comprise determining a variance in the pixel data of at least one of the selected groups of pixels; determining whether the variance exceeds a predetermined value; and performing a logic operation on the results of the range determining and the predetermined value determining, thereby generating an output indicative of there being at least a portion of a still object in the groups of pixels.

The method may further comprise: determining whether the pixel data of at least one of the selected groups contains data for displaying a moving and repeating object; and performing a logic operation on the results of the range determining and the moving and repeating object determining, thereby generating an output indicative of there being at least a portion of a still object in the groups of pixels.

The method may further comprise: repeating performing normalized cross correlation (NCC) on the pixel data of another two of the selected groups of pixels, thereby generating another NCC value; and determining how many of the selected groups of pixels consecutively have an NCC value which is within the predetermined range, thereby generating an output indicative of there being at least a portion of a still object in the groups of pixels.

The method may further comprise repeating throughout at least a portion of each of the plurality of consecutive frames: selecting a group of pixels from each of the plurality of consecutive frames, the selected groups of pixels being at corresponding positions in the plurality of consecutive frames; performing NCC on two of the selected groups of pixels, thereby generating an NCC value; and determining whether the NCC value is within the predetermined range. The method may further comprise determining whether groups of pixels having an NCC value within the predetermined range form a cluster of a predetermined size.

The still object may comprise a graphic symbol. The graphic symbol may be a logo that is at least partially opaque.

Another inventive aspect is a method of displaying digital video. The method comprises: determining the existence of a still object in digital video data with the method described above; and providing motion compensated interpolation at least partly in response to the still object determining.

Yet another inventive aspect is a system for detecting a still object in digital video data, comprising: means for selecting a plurality of consecutive frames from video data comprising a sequence of frames; means for selecting a group of pixels from each of the plurality of consecutive frames, the selected groups of pixels being at corresponding positions in the plurality of consecutive frames, the video data comprising pixel data for each of the pixels; means for performing normalized cross correlation (NCC) on the pixel data of two of the selected groups of pixels, thereby generating an NCC value; and first threshold means for determining whether the NCC value is within a predetermined range indicative of there being at least a portion of a still object in the groups of pixels. The pixel data may comprise at least one of luminance data and chrominance data.

The system may further comprise: means for determining a variance in the pixel data of at least one of the selected groups of pixels; second threshold means for determining whether the variance exceeds a predetermined value; and means for performing a logic operation on outputs from the first threshold means and the second threshold means, thereby generating an output indicative of there being at least a portion of a still object in the groups of pixels.

The system may further comprise: third threshold means for determining whether the pixel data of at least one of the selected groups contains data for displaying a moving and repeating object; and means for performing a logic operation on outputs from the first threshold means and the third threshold means, thereby generating an output indicative of there being at least a portion of a still object in the groups of pixels. The system may be configured to repeat performing normalized cross correlation (NCC) on the pixel data of another two of the selected groups of pixels, thereby generating another NCC value, and the system may further comprise counting means for determining how many of the selected groups of pixels consecutively have an NCC value which is within the predetermined range, thereby generating an output indicative of there being at least a portion of a still object in the groups of pixels.

The system may be configured to repeat throughout at least a portion of each of the plurality of consecutive frames: selecting a group of pixels from each of the plurality of consecutive frames, the selected groups of pixels being at corresponding positions in the plurality of consecutive frames; performing NCC on two of the selected groups of pixels, thereby generating an NCC value; and determining whether the NCC value is within the predetermined range.

The system may further comprise post-processing means for determining whether groups of pixels having an NCC value within the predetermined range form a cluster of a predetermined size. The still object may comprise a graphic symbol. The graphic symbol may be a logo that is at least partially opaque. The system may further comprise means for providing motion compensated interpolation at least partly in response to an output from the first threshold means. The system may further comprise means for processing the video data from a video data source to supply the sequence of frames.

Another inventive aspect is a device for detecting a still object in digital video data, comprising: a frame selection module configured to select a plurality of consecutive frames from video data comprising a sequence of frames; a group selection module configured to select a group of pixels from each of the plurality of consecutive frames, the selected groups of pixels being at corresponding positions in the plurality of consecutive frames, the video data comprising pixel data for each of the pixels; an normalized cross correlation (NCC) operator configured to perform normalized cross correlation (NCC) on the pixel data of two of the selected groups of pixels, thereby generating an NCC value; and a first threshold comparator configured to determine whether the NCC value is within a predetermined range indicative of there being at least a portion of a still object in the groups of pixels. The pixel data may comprise at least one of luminance data and chrominance data.

The device may further comprise: a variance determining module configured to determine a variance in the pixel data of at least one of the selected groups of pixels; a second threshold comparator configured to determine whether the variance exceeds a predetermined value; and a logic gate configured to perform a logic operation on outputs from the first threshold module and the second threshold module, thereby generating an output indicative of there being at least a portion of a still object in the groups of pixels.

The device may further comprise: a third threshold comparator configured to determine whether the pixel data of at least one of the selected groups contains data for displaying a moving and repeating object; and a logic gate configured to perform a logic operation on outputs from the first threshold means and the third threshold means, thereby generating an output indicative of there being at least a portion of a still object in the groups of pixels.

The device may be configured to repeat performing normalized cross correlation (NCC) on the pixel data of another two of the selected groups of pixels, thereby generating another NCC value; and the device may further comprise a counter configured to determine how many of the selected groups of pixels consecutively have an NCC value which is within the predetermined range, thereby generating an output indicative of there being at least a portion of a still object in the groups of pixels.

The device may be configured to repeat throughout at least a portion of each of the plurality of consecutive frames: selecting a group of pixels from each of the plurality of consecutive frames, the selected groups of pixels being at corresponding positions in the plurality of consecutive frames; performing NCC operation on two of the selected groups of pixels, thereby generating an NCC value; and determining whether the NCC value is within the predetermined range.

The device may further comprise a post-processor configured to determine whether groups of pixels having an NCC value within the predetermined range form a cluster of a predetermined size. The device may further comprise a motion compensated interpolation (MCI) module configured to provide motion compensated interpolation at least partly in response to an output from the first threshold module.

Another inventive aspect is a display device comprising: the device for detecting a still object in digital video data described above; and electronic circuitry configured to process the video data from a video data source to supply the sequence of frames.

BRIEF DESCRIPTION OF THE DRAWINGS

FIG. 5A is a diagram illustrating a digital video frame including a plurality of groups of pixels according to one embodiment.

FIG. 5B is a diagram illustrating a group of pixels of a digital video frame according to one embodiment.

FIG. 5C is a diagram illustrating a group of pixels of a digital video frame according to another embodiment.

FIG. 9A is a diagram illustrating an exemplary situation having a low probability of the existence of a still object within a group of pixels.

FIG. 9B is a diagram illustrating an exemplary situation having a high probability of the existence of a still object within a group of pixels.

FIG. 10A is a diagram illustrating an exemplary situation having a low probability of the existence of a still object on groups of pixels.

FIG. 10B is a diagram illustrating an exemplary situation having a high probability of the existence of a still object on groups of pixels.

DETAILED DESCRIPTION OF CERTAIN INVENTIVE EMBODIMENTS

Figure 1A:
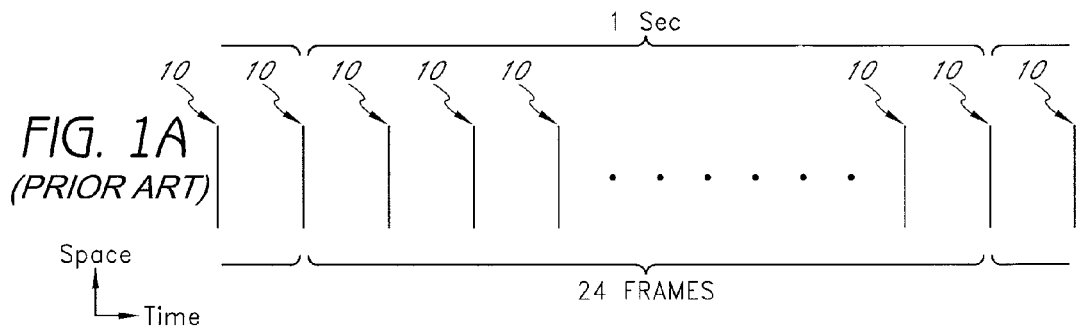
FIGS. 1A-1C are diagrams illustrating an exemplary method of motion compensated interpolation for digital video.
Figure 1B:
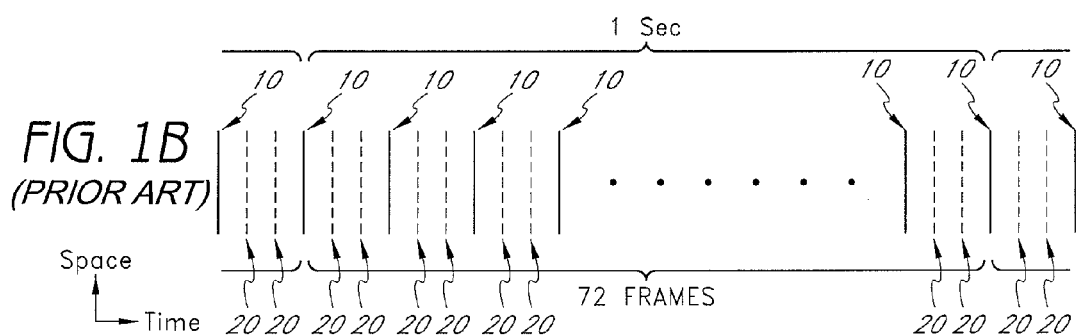
Figure 1C:
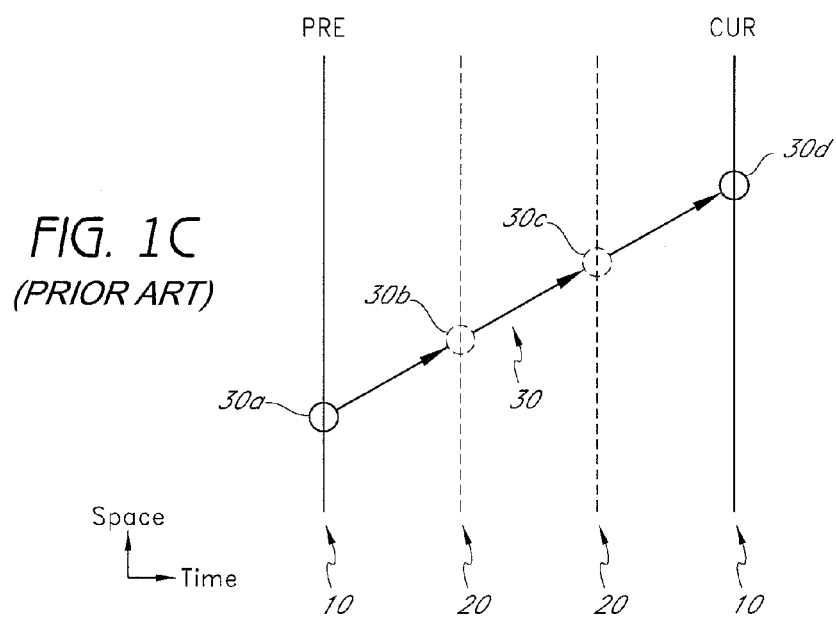

Various aspects and features of the invention will become more fully apparent from the following description and appended claims taken in conjunction with the foregoing drawings. In the drawings, like reference numerals indicate identical or functionally similar elements.

Figure 2A:
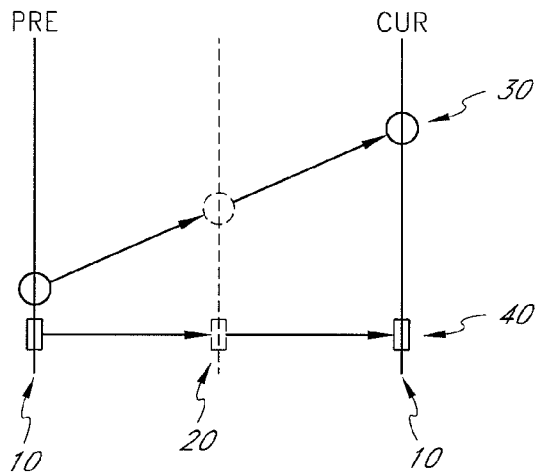
FIG. 2A-2C are diagrams illustrating examples of possible situations in motion compensated interpolation for digital video.

In motion compensated interpolation of video data, various situations may occur because video data in many instances include both moving and still objects on a sequence of frames. Referring to FIG. 2A, video data can have a moving object 30 and a still object 40 on two key frames 10.

Figure 2B:
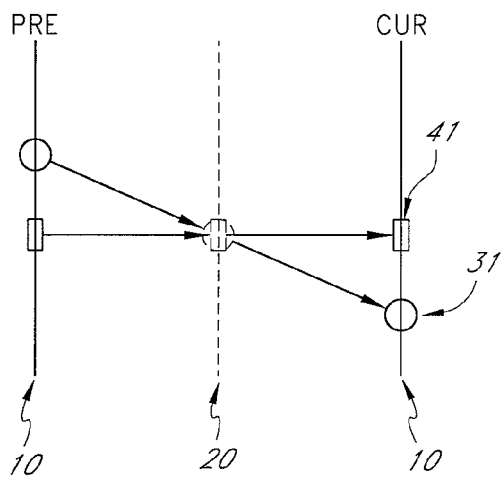

Referring to FIG. 2B, a moving object 31 and a still object 41 do not overlap with each other on key frames 10. However, the still object 41 falls on the trajectory of the moving object 31 on an interframe 20. Thus, the interframe 20 may be required to select one of the moving and still objects 31, 41, depending on whether the still object is in front of or behind the moving object. For example, if the still object 41 is in the background of an image displayed by the interframe 20, the moving object 31 is displayed. On the other hand, if the still object 41 is in front of the moving object, or is an overriding static symbol (e.g., a logo), the still object 41 is displayed instead of the moving object 31.

Figure 2C:
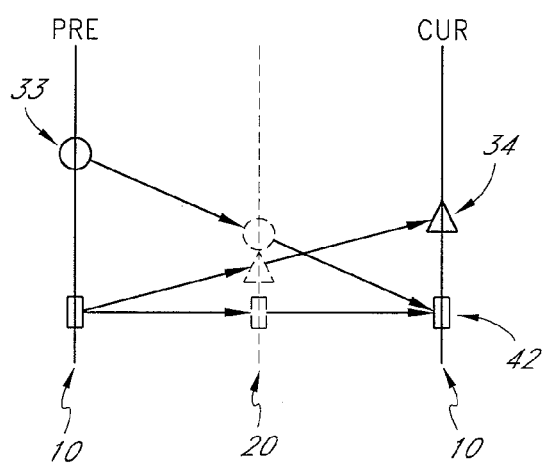

Referring to FIG. 2C, the position of a still object 42 on one of previous and current key frames PRE, CUR may affect the accuracy of estimating the trajectories of moving objects 33, 34. The position of the still object 42 can also affect the motion compensated interpolation (MCI) results of those moving objects 33, 34 on the interframe 20. In the illustrated example, the still object 42 is at the same position as a first moving object 33 on the current key frame CUR. The still object 42 is at the same position as a second moving object 34 on the previous key frame PRE. In these cases, trajectory estimation using the key frames PRE, CUR may be inaccurate.

Figure 2D:
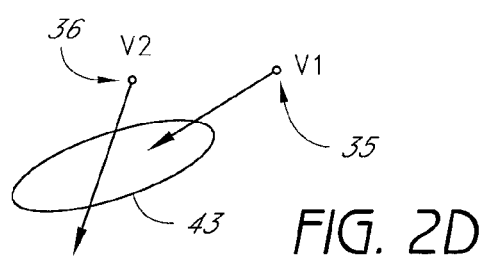
FIG. 2D is a diagram illustrating a moving object at least partially overlapping with a still object in motion compensated interpolation for digital video.

In one embodiment, whether a moving object overlaps with a still object on at least one of two consecutive key frames can be determined by counting how many times the moving vector of the moving object crosses the boundary of the still object. Referring to FIG. 2D, the moving vector V1 of a first moving object 35 crosses the boundary of a still object 43 once (or an odd number of times) when the moving vector V1 is projected onto the still object 43. In such a case, the first moving object 35 overlaps with the still object 43 on at least one of two consecutive key frames. On the other hand, the moving vector V2 of a second moving object 36 crosses the boundary of the still object 43 twice (or an even number of times) when the moving vector V2 is projected onto the still object 43. In this case, the second moving object 36 does not overlap with the still object 43 (see the moving object 31 of FIG. 2B).

In various situations including those described above, motion compensated interpolation (MCI) needs to be adjusted for various situations to provide accurate interframes. For suitable adjustment of MCI, there is a need to provide an accurate and reliable still object detection.

Modified Motion Compensated Interpolation

Figure 3:
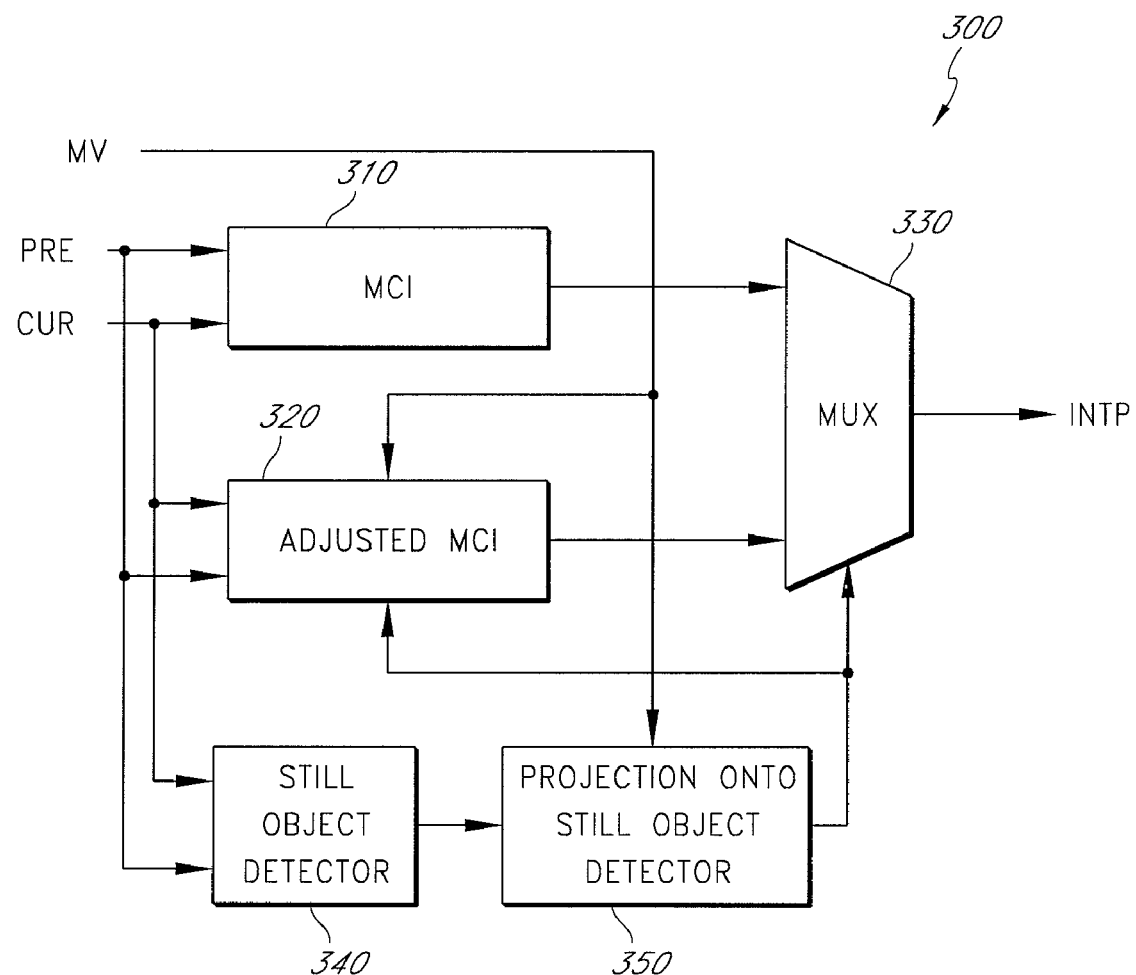
FIG. 3 is a block diagram of one embodiment of a system for motion compensated interpolation for digital video.

FIG. 3 illustrates one embodiment of a system for motion compensated interpolation. The illustrated system 300 is configured to process a sequence of key frames in video data so as to generate interframes. The system 300 is configured to process a pair of consecutive frames at a given time. A frame which has been processed at a previous process can be used to generate interframes at a subsequent process. For example, in an embodiment where first, second, and third consecutive frames are used to generate interframes, a pair of the first and second frames are processed first, and then a pair of the second and third frames are processed next. The illustrated system 300 includes a motion compensated interpolator (MCI) 310, an adjusted motion compensated interpolator (AMCI) 320, a multiplexer 330, a still object detector 340, and a projection-onto-still-object (POSO) detector 350. The system 300 can also include a frame selection module (not shown) configured to select and provide at least two consecutive frames from video data.

The MCI 310 receives two consecutive frames from the sequence of key frames: a previous frame PRE and a current frame CUR in the illustrated embodiment. The current frame is one that immediately succeeds to the previous frame in the sequence of frames. Each of the frames PRE, CUR contains digital data for the video frame. In one embodiment, the frames PRE, CUR only contain data indicative of the luminance components of the frames. In other embodiments, the frames PRE, CUR can also contain data indicative of the chrominance components of the frames. The MCI 310 is configured to generate interframes based on the frame data of both of the frames PRE, CUR.

The AMCI 320 also receives the previous frame PRE and the current frame CUR. The AMCI 320 is configured to generate interframes in situations in which the MCI 310 cannot provide accurate interframes. For example, the MCI 310 cannot generate accurate interframes in the situations described above in connection with FIGS. 2B and 2C.

The multiplexer 330 is configured to provide one of outputs from the MCI 310 and the AMCI 320, depending on the situation. In a situation similar to that shown in FIG. 2A, the multiplexer 330 is configured to pass the output from the MCI 310 while blocking the output from the AMCI 320. In situations in which the MCI 310 cannot provide accurate interframes (e.g., those shown in FIGS. 2B and 2C), the multiplexer 330 is configured to pass the output from the AMCI 320 while blocking the output from the MCI 310.

The still object detector 340 receives the previous frame PRE and the current frame CUR. The still object detector 340 is configured to detect still objects on the frames PRE, CUR, and provide an output signal to the POSO detector 350. The output signal contains data indicative of the positions of still objects on the frames PRE, CUR. The configuration and operation of the still object detector 340 will be described later in detail.

The POSO detector 350 receives the output signal from the still object detector 340. The POSO detector 350 also receives a signal containing moving vector data MV. The POSO detector 350 is configured to determine whether there are situations in which the MCI 310 cannot generate accurate interframes, based on the still object detector output and the moving vector data MV. In one embodiment, the POSO detector 350 can determine which one of the following four situations exists. In a first situation, a moving object on both of the previous and current frames PRE, CUR does not overlap with a still object (e.g., the situation shown in FIG. 2A). In a second situation, a moving object on both of the previous and current frames PRE, CUR does not overlap with a still object, but the moving object overlaps with the still object on an interframe between the previous and current frames (e.g., the moving object 31 in the situation shown in FIG. 2B). In a third situation, a moving object on one of the previous and current frames PRE, CUR overlaps with a still object (e.g., the situations shown in FIG. 2C). In one embodiment, the POSO detector 350 can use the detection scheme described above with respect to FIG. 2D.

In the first situation, the POSO detector 350 can provide a selection signal for the multiplexer 330 to pass the output of the MCI 310. In the other situations, the POSO detector 350 can provide another selection signal for the multiplexer 330 to pass the output from the AMCI 320. The POSO detector 350 also provides a control signal to the AMCI 320 so as to allow the AMCI 320 to produce an interframe suitable for the situation.

Still Object Detection

Figure 4:
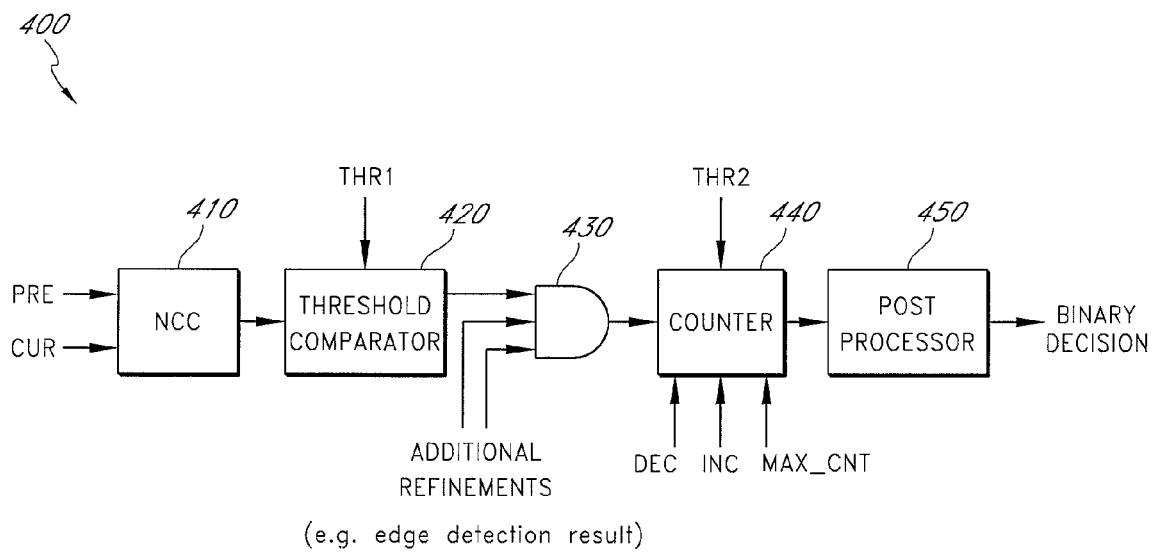
FIG. 4 is a block diagram of one embodiment of a still object detector for motion compensated interpolation for digital video.

FIG. 4 is a block diagram of a still object detector according to one embodiment. The still object detector 400 can be used in the context of the system 300 of FIG. 3. A skilled artisan will, however, appreciate that the still object detector 400 can be used with various other systems for various purposes.

The illustrated still object detector 400 includes a normalized cross correlation (NCC) operator 410, a threshold comparator 420, an AND logic gate 430, a counter 440, and a post processor 450. It will be appreciated that two or more of the foregoing components can be combined with one another. In other embodiments, at least one of the AND logic gate 430, the counter 440, and the post processor 450 can be omitted or replaced with any other suitable components.

Figure 5A:
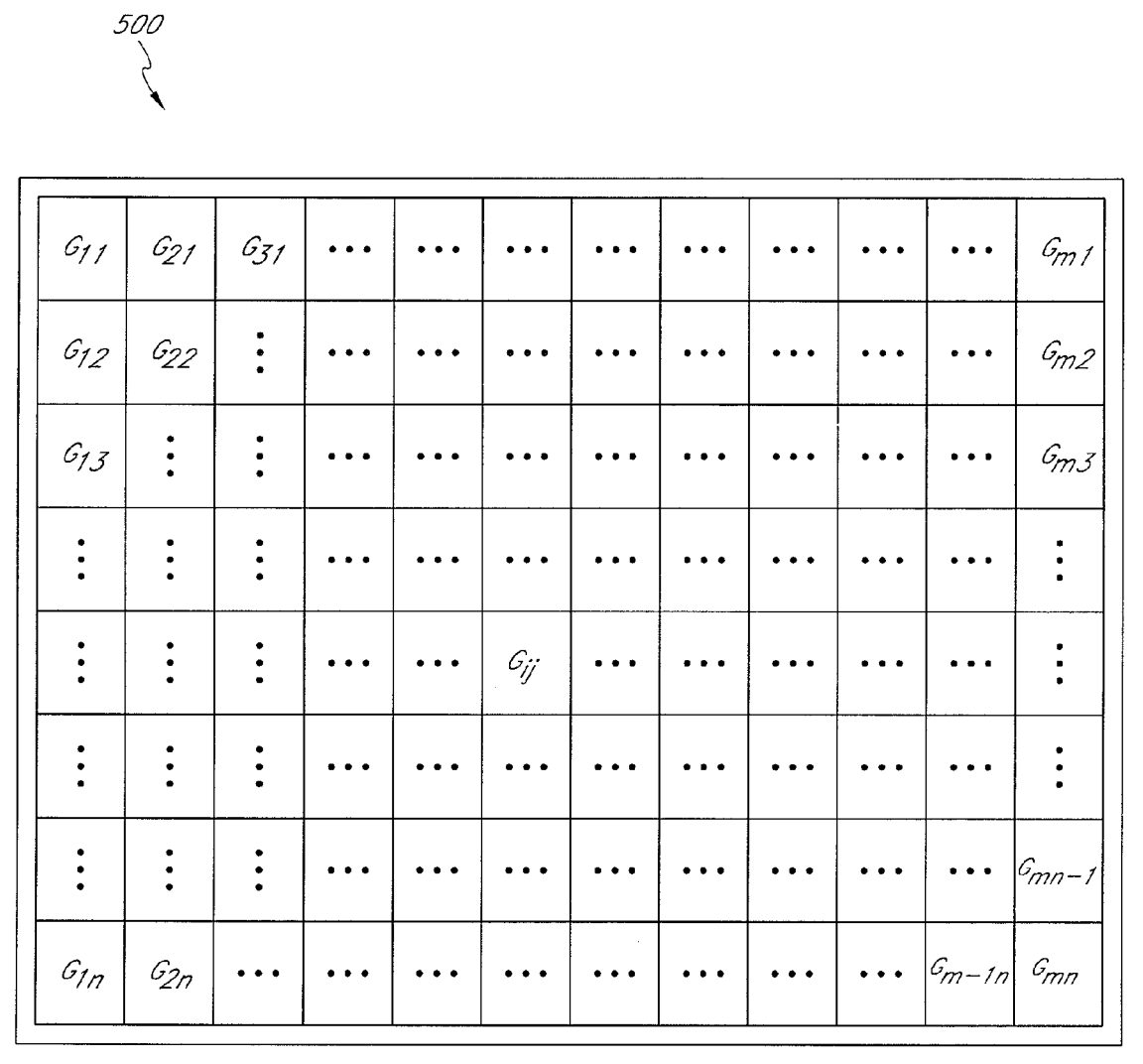

The illustrated still object detector 400 is configured to detect a still object on substantially the entire portion of a video frame. In other embodiments, the still object detector 400 may be configured to process only a predetermined portion of a video frame (e.g., at least one of the four corners of a frame). Referring to FIG. 5A, the still object detector is configured to operate on a group of pixels G11, G21, G31, . . . , Gij, . . . , or Gmn ($1 \leq i \leq m$; $1 \leq j \leq n$) on a frame 500 at a given time. Then, the still object detector 400 continues to process a next group of pixels on the frame 500. In one embodiment, the still object detector starts processing a group of pixels at an upper left corner of a frame, and continues to process another group of pixels in the same row. In other words, the still object detector 400 scans through the frame 500 row by row. In another embodiment, the still object detector 400 can scan the frame 500 column by column. In yet another embodiment, a group of pixels (GOP) Gij can include a pixel at row i and column j and its neighboring pixels. In other words, each and every pixel can have its own corresponding GOP. Therefore, for an entire frame, a total number of GOPs is equal to a total number of pixels. In such an embodiment, neighboring GOPs partially overlap with one another.

In the context of this document, the term "group of pixels" refers to a selected number of neighboring pixels on a frame. In one embodiment, a group of pixel can include, for example, 5×5 pixels (FIG. 5B), 7×5 pixels (FIG. 5C), or 7×7 pixels. It will be appreciated that a selected number of pixels can form various shapes, e.g., a square, a rectangle, a diamond, and a circle. The still object detector 400 can include a group selection module (not shown) configured to select groups of pixels from given frames as described above.

The NCC operator 410 is configured to process corresponding groups of pixels from a pair of consecutive frames. The illustrated NCC operator 410 is configured to process a group of pixels (GOP) Y from a current frame CUR and a corresponding group of pixels (GOP) X from an immediately previous frame PRE. The group of pixels Y from the current frame CUR is at the same position as the corresponding group of pixels X from the immediately previous frame PRE.

The illustrated NCC operator 410 performs a normalized cross-correlation (NCC) operation on the luminance values of the groups of pixels X and Y. In other embodiments, the chrominance values of the groups of pixels X and Y can be used alternatively or in combination with the luminance values for the NCC operation. The NCC operation can produce an NCC value, NCC (X, Y) which is represented by Equation 1.

$$NCC(X, Y) = \frac{\sum_i (x_i - \mu_X)(y_i - \mu_Y)}{\sqrt{\sum_i (x_i - \mu_X)^2 \sum_i (y_i - \mu_Y)^2}} \quad (1)$$

where $x_i \in X$, $y_i \in Y$; $\mu_X$ is the average of the GOP X; and $\mu_Y$ is the average of the GOP Y.

The NCC value ranges between −1 and 1. An NCC value of greater than 0 indicates that the GOPs X and Y are positively correlated. An NCC value of less than 0 indicates that the GOPs X and Y are negatively correlated. An NCC value which is equal to 0 indicates that there is no correlation between the GOPs X and Y. A positive correlation between the GOPs X and Y indicates that GOPs X and Y are similar. The closer to 1 the NCC value is, the more similar the GOPs X and Y are. If the NCC value is less than or equal to 0, the GOPs X and Y are not similar.

Figure 6A:
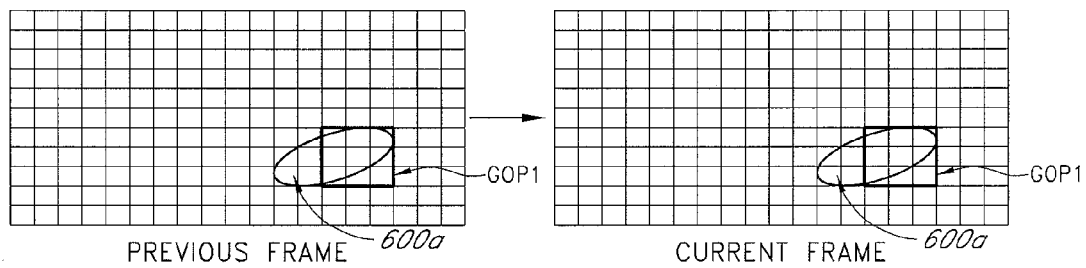
FIG. 6A is a diagram illustrating a still object displayed on previous and current frames.
Figure 6B:
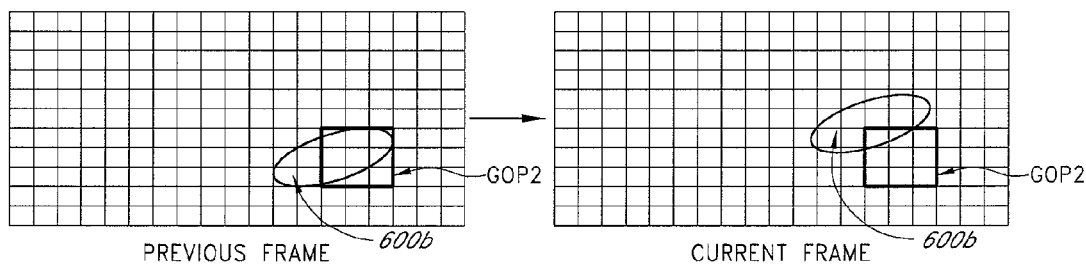
FIG. 6B is a diagram illustrating a moving object displayed on previous and current frames.

If the groups of pixels X and Y are identical or similar, there is a high probability that an object displayed at least partially by the groups of pixels X, Y is a still object. Referring to FIG. 6A, both a previous frame and a current frame display a still object 600a on a portion of a group of pixels GOP 1. In this case, the NCC value of the group of pixels GOP 1 is close to 1. On the other hand, in FIG. 6B, a previous frame and a current frame display a moving object 600b on a portion of a group of pixels GOP 2. In this case, the NCC value of the group of pixels GOP 2 is close to 0. The NCC operation allows a reliable still object detection even when the frames display a partially transparent still object with an overlapping moving object behind the still object.

The threshold comparator 420 is configured to set a predetermined range for determining whether the NCC value resulting from an NCC operation indicates the existence of a still object or not. In one embodiment, the threshold comparator 420 can set a range of about 0.8 to about 1. The range can be adjusted via a threshold input THR1. If the NCC value falls within this range, the threshold comparator 420 generates a TRUE output signal, and otherwise a FALSE output signal. It will be appreciated that the range may vary widely depending on the design of the still object detector.

The AND gate 430 performs an AND operation on an output signal from the threshold comparator 420 and other refinement data. An exemplary refinement factor is whether the pixel data of a selected group of pixels indicates that there is a high probability of the existence of an edge of an object. In one embodiment, this can be determined by an edge detection scheme.

Figure 7A:
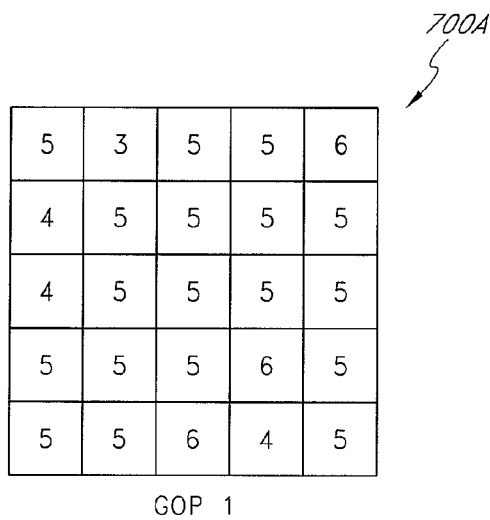
FIG. 7A is a diagram illustrating an exemplary situation having a low probability of the existence of an edge within a group of pixels.
Figure 7B:
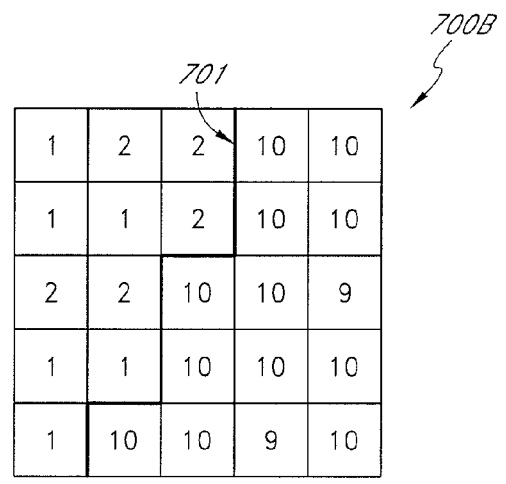
FIG. 7B is a diagram illustrating an exemplary situation having a high probability of the existence of an edge within a group of pixels.

An exemplary edge detection scheme can use a local variance within a group of pixels of a frame. Referring to FIGS. 7A and 7B, a group of pixels 700A, 700B can have pixel data for each of the pixels. The pixel data can include luminance data represented by a number indicative of the brightness level of the pixel. The edge detection scheme may determine whether a variance within the group of pixels exceeds a predetermined value. If the local variance exceeds the predetermined value, which is indicative of the existence of an edge of an object, an input to the AND gate 430 is TRUE. If the local variance does not exceed the predetermined value, which is indicative of the non-existence of an edge of an object, the input to the AND gate 430 is FALSE.

For example, in FIG. 7A, a group of pixels 700A has pixel data with a low variance within the group of pixels. The pixel data include similar brightness levels, 3, 4, 5, and 6 substantially uniformly distributed over the group of pixels 700A. In this case, there is a low probability of the existence of an edge of an object because the existence of an edge may involve a sharp contrast in brightness, forming two areas for an object and its background. On the other hand, in FIG. 7B, a group of pixels 700B has pixel data with a high variance within the group of pixels. The pixel data provides a sharp contrast, forming a boundary 701 between two areas. In this case, there is a high probability of the existence of an object, which may be a still object.

Figure 8:
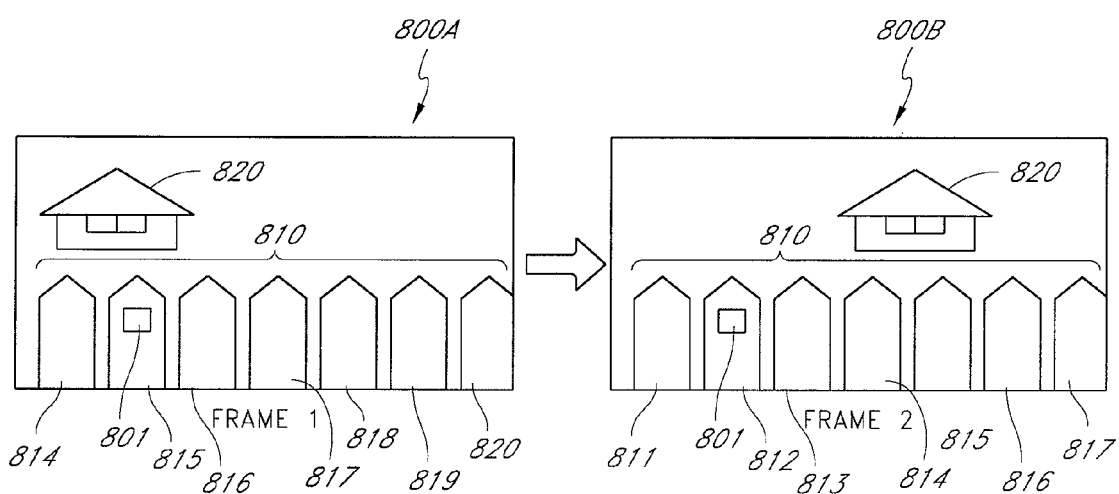
FIG. 8 illustrates an exemplary situation in which portions of frames display a moving and repeating object.

Another exemplary refinement factor is moving and repeating object data. The moving and repeating object data refers to data with which a group of pixels displays a portion of a moving object, but the same or similar image because of the moving object's repetitiveness. For example, in FIG. 8, a video displays a picket fence 810 taken by a moving video camera. The picket fence 810 includes vertical board or pickets 811-820 having identical shape, size, and color. A group of pixels 801, although in fact displaying different (i.e., moving) objects 812 and 815, appears to display the same (i.e., still) object because the pickets 811-820 look identical. In this case, however, the moving vectors MV of the pickets 811-820 are not 0. In such an instance, an input to the AND gate 430 is FALSE. Otherwise, the input to the AND gate 430 is TRUE.

In the illustrated embodiment, the AND gate 430 outputs a TRUE output signal only when all of the inputs are TRUE, otherwise a FALSE output signal. In other embodiments, the AND gate may be replaced with an OR gate. In other embodiments, the AND gate may be combined or replaced with one or more of other types of logic gates. In certain embodiments, the AND gate can be omitted.

The counter 440 is configured to ensure the consistency of the decision and improve the robustness of the still object detection. The counter 440 is configured to count the number of frames in which a given group of pixels consecutively generates a TRUE output signal from the AND gate 430. The higher the number is, the more likely the group of pixels displays at least a portion of a still object. The lower the number is, the less likely the group of pixels displays at least a portion of a still object.

Referring to FIGS. 9A and 9B, each of frames 1-10 has an output (TRUE or FALSE) from the AND gate 430 for a given group of pixels 901, 902. The counter 440 is configured to count how many TRUE outputs are consecutively output from the AND gate 430. In FIG. 9A, no significant number of TRUEs is consecutively output from a sequence of frames, which indicates that there is a low probability of the existence of a still object on the group of pixels 901. On the other hand, in FIG. 9B, a substantial number of TRUEs are consecutively output from frame 2 to frame 10, which indicates that there is a high probability of the existence of a still object on the group of pixels 902.

In one embodiment, the counter 440 can use an accumulated counter acc_cnt to keep track of how reliable the current decision is, based on the past decision. The value of the accumulated counter can be updated as represented by Equation 2:

$$\text{acc\_cnt} = \text{acc\_cnt} + \text{INC if the result from the AND gate } \mathbf{430} \text{ is TRUE acc\_cnt} - \text{DEC if the result from the AND gate } \mathbf{430} \text{ is FALSE} \quad (2)$$

In Equation 2, each of acc_cnt, INC, and DEC is an integer. Each of INC and DEC can be an odd or even number. The counter 440 may be configured to count the number of frames up to a maximum count MAX_CNT for a given still object detection. For example, if the maximum count is 16, the counter 440 can count up to 16 frames to detect a still object from a group of pixels.

If the value of the accumulated counter exceeds a threshold THR2, the counter 440 outputs a TRUE signal, and otherwise a FALSE signal. The threshold THR2 can be any suitable number equal to or smaller than the maximum count MAX_CNT. In the illustrated embodiment, the INC, DEC, MAX_CNT, and THR2 can be adjusted via a controller (not shown).

The post processor 450 is configured to further enhance the reliability of the still object detection. After having binary decisions (TRUE or FALSE) for at least some of groups of pixels on a frame, the post processor 450 is configured to determine whether there is an error in the decisions. For example, a still object is more likely displayed by a cluster of groups of pixels with a TRUE decision (see FIG. 10B), rather than a single isolated group of pixels with a TRUE decision (see FIG. 10A). In the illustrated embodiment, the post processor 450 determines whether groups of pixels with a TRUE decision in a frame form a cluster of a predetermined size (e.g., 10, 20, 30, 40, 50, and the like). If yes, the post processor 450 outputs a TRUE signal, and otherwise, it outputs a FALSE signal. In other embodiments, the post processor 450 can use different error detecting schemes, or can be omitted.

The still object detector 400 is described above in the context of a system for motion compensated interpolation. However, it will be appreciated that the still object detector can be used for various other applications (e.g., logo detection).

Figure 11:
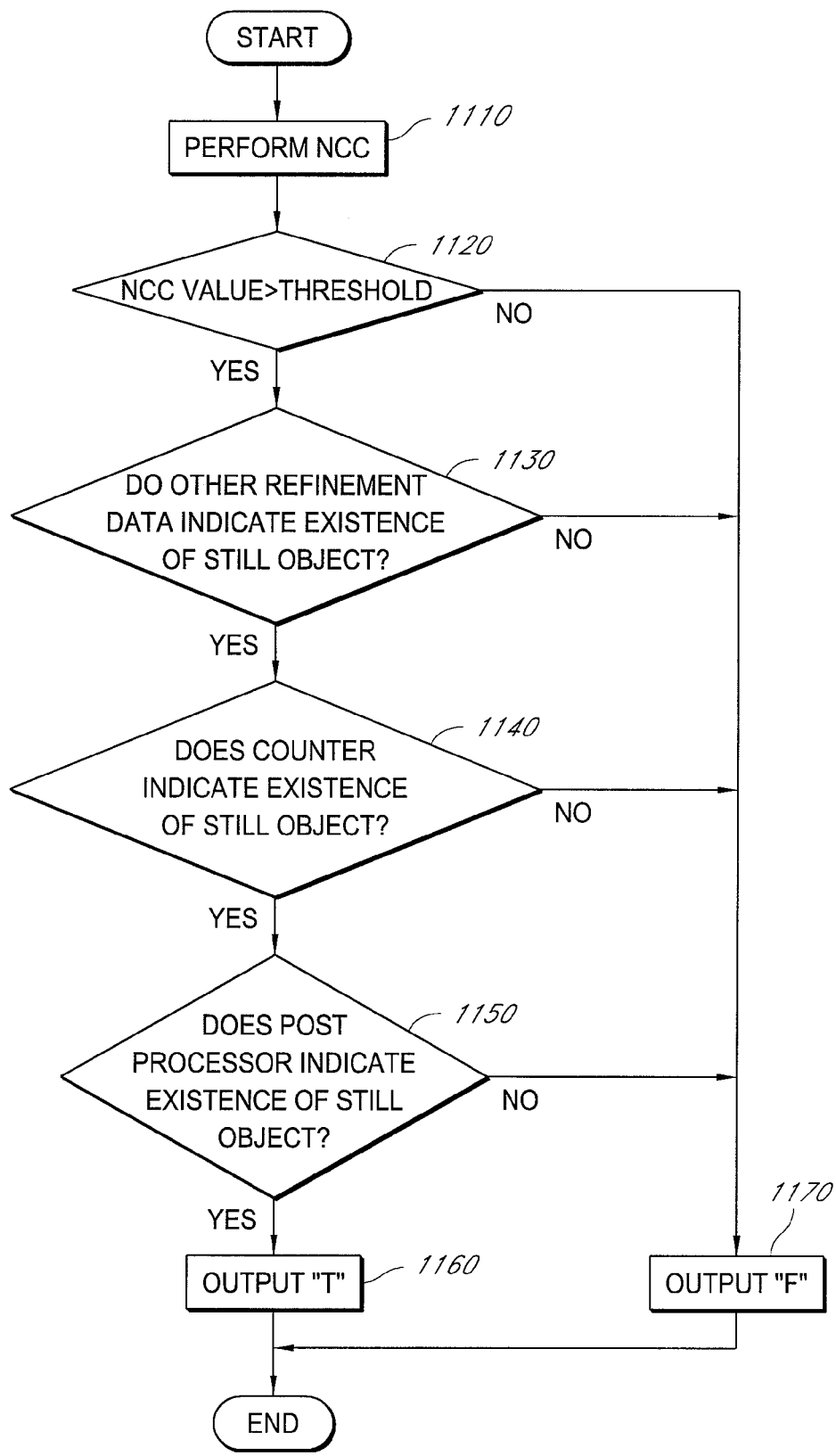
FIG. 11 is a flowchart illustrating a method of detecting a still object for motion compensated interpolation for digital video according to one embodiment.

Referring to FIGS. 4 and 11, a method of detecting a still object according to one embodiment will be described below. At block 1110 of FIG. 11, an NCC operation is performed on two corresponding groups of pixels from current and previous frames. The details of the NCC operation can be as described above with respect to the NCC operator 410 of FIG. 4.

Next, at block 1120, an NCC value from block 1110 is compared with a threshold value. This block can be implemented with the threshold comparator 420 of FIG. 4. If the NCC value exceeds the threshold value, the process proceeds to block 1130, or otherwise, to block 1170 in which an "F" or "0" binary signal is output. The "F" signal indicates that there is no still object within the groups of pixels.

At block 1130, it is determined whether other refinement data indicate the existence of a still object in the groups of pixels. The details of the other refinement data can be as described above with respect to the AND logic gate 430 of FIG. 4. If all the other refinement data indicate the existence of a still object, the process goes to block 1140, or otherwise, to block 1170.

Subsequently, at block 1140, it is determined whether a counter outputs a result indicative of the existence of a still object in the groups of pixels. The details of the counter can be as described above with respect to the counter 440 of FIG. 4.

If the counter outputs a result indicative of the existence of a still object, the process goes to block 1150, or otherwise, to block 1170.

Next, at block 1150, it is determined whether a post processor outputs a signal indicative of the existence of a still object. The details of the post processor can be as described above with respect to the post processor 450 of FIG. 4. If the post processor outputs a signal indicative of the existence of a still object, the process goes to block 1160, or otherwise, to block 1170. At block 1160, a "T" or "1" binary signal is output to indicate the existence of a still object within the groups of pixels. These blocks can be repeated for groups of pixels throughout at least part of a frame. A skilled technologist will appreciate that some blocks of FIG. 11 can be omitted or combined with one another. It will also be appreciated that any other blocks suitable for enhancing a still object detection can be added.

The embodiments described above may be implemented in any device that is configured to display digital video. Such devices can include electronic circuitry configured to process video data from a video data source to supply a sequence of frames. More particularly, the embodiments may be implemented in or associated with a variety of electronic devices such as, but not limited to, televisions (particularly high-definition digital televisions), mobile telephones, wireless devices, personal data assistants (PDAs), hand-held or portable computer monitors, GPS receivers/navigators, cameras, MP3 players, camcorders, game consoles, electronic billboards or signs, and projectors.

The still object detector of the embodiments described above provides an accurate and reliable still object detection using an normalized cross correlation (NCC) operation. The NCC operation allows a reliable still object detection even when frames display a partially transparent still object with an overlapping moving object behind the still object. The still object detector also includes additional components (the AND gate 430, counter 440, and post processor 450) to further ensure the robustness of the still object detection.

The foregoing description is that of embodiments of the invention and various changes, modifications, combinations and sub-combinations may be made without departing from the spirit and scope of the invention, as defined by the appended claims.

What is claimed is:

1. A method of detecting a still object in digital video data, the method comprising: providing video data comprising a sequence of frames;
   selecting a plurality of consecutive frames from the sequence of frames;
   selecting a group of pixels from each of the plurality of consecutive frames, the selected groups of pixels being at corresponding positions in the plurality of consecutive frames, the video data comprising pixel data for each of the pixels;
   performing normalized cross correlation (NCC) on the pixel data of two of the selected groups of pixels, thereby generating an NCC value; and
   determining whether the NCC value is within a predetermined range indicative of there being at least a portion of the still object in the groups of pixels;
   determining whether the pixel data of at least one of the selected groups contains data for displaying a moving and repeating object on a device; and
   performing a logic operation on the results of the range determining and the moving and repeating object determining, thereby generating an output indicative of there being at least the portion of the still object in the groups of pixels.

2. The method of claim 1, wherein the pixel data comprises at least one of luminance data and chrominance data.

3. The method of claim 1, further comprising:
   determining a variance in the pixel data of at least one of the selected groups of pixels;
   determining whether the variance exceeds a predetermined value; and
   performing a logic operation on the results of the range determining and the predetermined value determining, thereby generating an output indicative of there being at least a portion of the still object in the groups of pixels.

4. The method of claim 1, further comprising:
   repeating performing normalized cross correlation (NCC) on the pixel data of another two of the selected groups of pixels, thereby generating another NCC value; and
   determining how many of the selected groups of pixels consecutively have an NCC value which is within the predetermined range, thereby generating an output indicative of there being at least a portion of the still object in the groups of pixels.

5. The method of claim 1, further comprising repeating throughout at least a portion of each of the plurality of consecutive frames:
   selecting the group of pixels from each of the plurality of consecutive frames, the selected groups of pixels being at corresponding positions in the plurality of consecutive frames;
   performing NCC on two of the selected groups of pixels, thereby generating an NCC value; and
   determining whether the NCC value is within the predetermined range.

6. The method of claim 5, further comprising determining whether groups of pixels having an NCC value within the predetermined range form a cluster of a predetermined size.

7. The method of claim 1, wherein the still object comprises a graphic symbol.

8. The method of claim 7, wherein the graphic symbol is a logo that is at least partially opaque.

9. The method of claim 1 further comprising:
   determining the existence of the still object in the digital video data; and
   providing motion compensated interpolation at least partly in response to the still object determining.

10. A system for detecting a still object in digital video data, comprising: means for selecting a plurality of consecutive frames from video data comprising a sequence of frames;
   means for selecting a group of pixels from each of the plurality of consecutive frames, the selected groups of pixels being at corresponding positions in the plurality of consecutive frames, the video data comprising pixel data for each of the pixels;
   means for performing normalized cross correlation (NCC) on the pixel data of two of the selected groups of pixels, thereby generating an NCC value; and
   first threshold means for determining whether the NCC value is within a predetermined range indicative of there being at least a portion of the still object in the groups of pixels;
   third threshold means for determining whether the pixel data of at least one of the selected groups contains data for displaying a moving and repeating object; and
   means for performing a logic operation on outputs from the first threshold means and the third threshold means, thereby generating an output indicative of there being at least the portion of the still object in the groups of pixels.

11. The system of claim 10, wherein the pixel data comprises at least one of luminance data and chrominance data.

12. The system of claim 10, further comprising:
means for determining a variance in the pixel data of at least one of the selected groups of pixels;
second threshold means for determining whether the variance exceeds a predetermined value; and
means for performing a logic operation on outputs from the first threshold means and the second threshold means, thereby generating an output indicative of there being at least a portion of the still object in the groups of pixels.

13. The system of claim 10, wherein the system is configured to repeat performing normalized cross correlation (NCC) on the pixel data of another two of the selected groups of pixels, thereby generating another NCC value; and
wherein the system further comprises counting means for determining how many of the selected groups of pixels consecutively have an NCC value which is within the predetermined range, thereby generating an output indicative of there being at least a portion of the still object in the groups of pixels.

14. The system of claim 10, wherein the system is configured to repeat throughout at least a portion of each of the plurality of consecutive frames:
selecting the group of pixels from each of the plurality of consecutive frames, the selected groups of pixels being at corresponding positions in the plurality of consecutive frames;
performing NCC on two of the selected groups of pixels, thereby generating an NCC value; and
determining whether the NCC value is within the predetermined range.

15. The system of claim 14, further comprising post-processing means for determining whether groups of pixels having an NCC value within the predetermined range form a cluster of a predetermined size.

16. The system of claim 10, wherein the still object comprises a graphic symbol.

17. The system of claim 16, wherein the graphic symbol is a logo that is at least partially opaque.

18. The system of claim 10, further comprising means for providing motion compensated interpolation at least partly in response to an output from the first threshold means.

19. The system of claim 18, further comprising means for processing the video data from a video data source to supply the sequence of frames.

20. A device for detecting a still object in digital video data, comprising: a frame selection module configured to select a plurality of consecutive frames from video data comprising a sequence of frames;
a group selection module configured to select a group of pixels from each of the plurality of consecutive frames, the selected groups of pixels being at corresponding positions in the plurality of consecutive frames, the video data comprising pixel data for each of the pixels;
an normalized cross correlation (NCC) operator configured to perform normalized cross correlation (NCC) on the pixel data of two of the selected groups of pixels, thereby generating an NCC value; and
a first threshold comparator configured to determine whether the NCC value is within a predetermined range indicative of there being at least a portion of the still object in the groups of pixels;
a third threshold comparator configured to determine whether the pixel data of at least one of the selected groups contains data for displaying a moving and repeating object on the device; and
a logic gate configured to perform a logic operation on outputs from the first threshold means and the third threshold means, thereby generating an output indicative of there being at least the portion of the still object in the groups of pixels.

21. The device of claim 20, wherein the pixel data comprises at least one of luminance data and chrominance data.

22. The device of claim 20, further comprising:
a variance determining module configured to determine a variance in the pixel data of at least one of the selected groups of pixels;
a second threshold comparator configured to determine whether the variance exceeds a predetermined value; and
a logic gate configured to perform a logic operation on outputs from the first threshold module and the second threshold module, thereby generating an output indicative of there being at least a portion of the still object in the groups of pixels.

23. The device of claim 20, wherein the device is configured to repeat performing normalized cross correlation (NCC) on the pixel data of another, two of the selected groups of pixels, thereby generating another NCC value; and
wherein the device further comprises a counter configured to determine how many of the selected groups of pixels consecutively have an NCC value which is within the predetermined range, thereby generating an output indicative of there being at least a portion of the still object in the groups of pixels.

24. The device of claim 20, wherein the device is configured to repeat throughout at least a portion of each of the plurality of consecutive frames:
selecting the group of pixels from each of the plurality of consecutive frames, the selected groups of pixels being at corresponding positions in the plurality of consecutive frames;
performing NCC operation on two of the selected groups of pixels, thereby generating an NCC value; and
determining whether the NCC value is within the predetermined range.

25. The device of claim 24, further comprising a post-processor configured to determine whether groups of pixels having an NCC value within the predetermined range form a cluster of a predetermined size.

26. The device of claim 20, further comprising:
a motion compensated interpolation (MCI) module configured to provide motion compensated interpolation at least partly in response to an output from the first threshold module.

27. The device of claim 20 further comprising:
electronic circuitry configured to process the video data from a video data source to supply the sequence of frames.

* * * * *